July 11, 1933.    J. H. LUFT    1,918,115
FLOWER HOLDER
Filed April 28, 1933
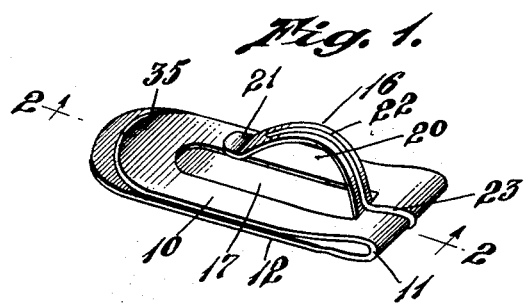
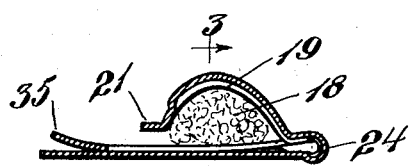
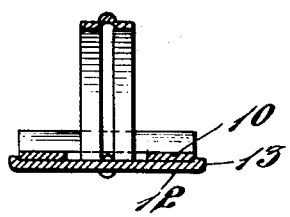
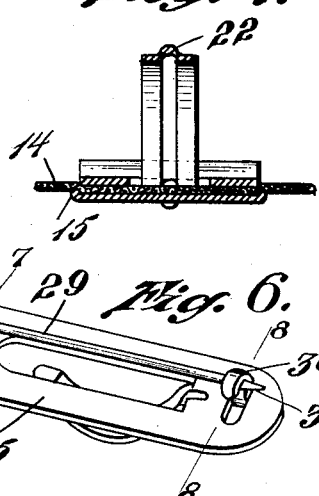
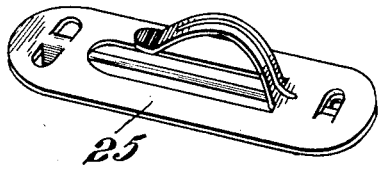
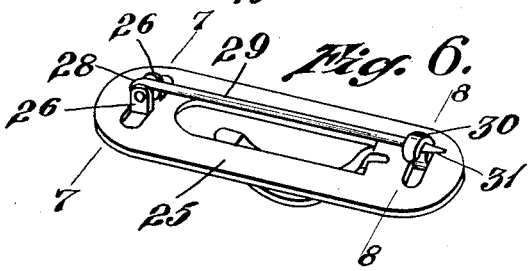
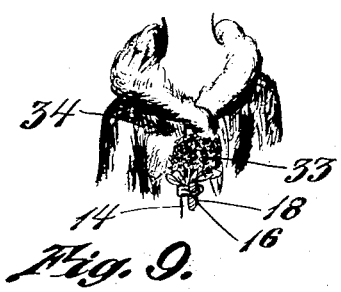
INVENTOR.
John H. Luft
BY Barlow & Barlow
ATTORNEYS.

Patented July 11, 1933

1,918,115

UNITED STATES PATENT OFFICE

JOHN H. LUFT, OF PROVIDENCE, RHODE ISLAND

FLOWER HOLDER

Application filed April 28, 1933. Serial No. 668,361.

This invention relates to a flower holder and has for one of its objects the provision of a device which may be easily and quickly secured in position upon the garment and will also serve to maintain a bunch of flowers in a desired adjusted position when so mounted upon the garment.

Another object of the invention is the provision of a flower holder formed by deflecting material of a sheet stock without the use of solder or the like which may cause annealing of a highly resilient piece of stock.

Another object of the invention is the provision of a resilient finger for engaging and securely holding a bunch of flowers in desired position with the free end of the finger readily accessible for the insertion of the stems of a bunch of flowers.

Another object of the invention is the provision of means for strengthening the resilient finger such as by deflecting the stock of the same at the point where greater stiffening is desired.

A further object of the invention is the provision of a construction which may be formed by machine tool operations quickly, economically and in multiple.

With these and other objects in view, the invention consists of certain novel features of construction, as will be more fully described, and particularly pointed out in the appended claims.

In the accompanying drawing:

Fig. 1 is a perspective view of a flower holder formed in accordance with my invention.

Fig. 2 is a central sectional view substantially on line 2—2 of Fig. 1 and illustrating diagrammatically the position of the stems of a bunch of flowers therein.

Fig. 3 is a section on line 3—3 of Fig. 2.

Fig. 4 illustrates a section similar to section 3 but showing the device as mounted upon the edge of a piece of fabric.

Fig. 5 is a perspective view of a modified form of flower holder.

Fig. 6 is a perspective view of the structure shown in Fig. 5 looking at the bottom thereof.

Fig. 7 is a section on line 7—7 of Fig. 6.

Fig. 8 is a section on line 8—8 of Fig. 6.

Fig. 9 illustrates the device as mounting a bunch of flowers upon the outer garment of a woman's clothing.

It is frequently desired to secure a bunch of flowers upon the person and the usual means for accomplishing this result is by some sort of straight pin which must perforate the dress or other garment upon which the flowers are to be secured, and when such a pin is used upon dresses formed of silk or sheet fabrics, a hole is formed in these fabrics which, when the flowers are removed, will be visible and detract from the appearance of the dress. Also the use of a pin does not sufficiently secure the flowers in place so that they will remain in the position desired while being worn, and in order that these undesirable results may be avoided I have provided a clip with a broad engaging finger to hold a bunch of flowers in a desired adjusted position and have formed a resilient jaw which may hold the same on a dress so that no perforation thereof is required while in another instance where perforation is not detrimental, such as on coats or the like, I may secure the improved holding device in position by a hinged pin mounted in position by integral portions of the stock from which the finger has been formed, and the following is a more detailed description of the present embodiment of this invention illustrating the preferred means by which these advantageous results may be accomplished.

With reference to the drawing, 10 designates a sheet metal body which has an extension at one end folded as at 11 to provide a jaw 12. This fold in the resilient stock permits the body and jaw 12 to be moved apart under elastic tension tending to return these parts into contacting relation and thus the body 10 may be mounted by sliding the edge of a garment between these two parts which is facilitated by the upturned end 35 of the body.

In order that a better gripping action may be had between the jaw and the body I have formed the jaw 12 of a width greater than the body 10 and turned the edges 13 thereof upwardly as will be illustrated in Fig. 3 whereby there is a better biting action had along these edges upon a fabric such as 14 to grip the same as at 15 between the corner of this turned up lip 13 and the corners of the body portion 10, and thus by more tightly and firmly gripping the fabric at these spaced points I may maintain the body in such desired position as I require upon the edge of a dress even though it be made of sheer fabric.

A tongue 16 is cut and raised from the sheet stock of the body 10 leaving an opening 17 in this stock. This tongue is arcuate in shape as illustrated in the drawing so as to receive the stems 18 of a bunch of flowers. The undersurface 19 of this arcuate shaped finger will engage one side of the bunch of stems, and the surface 20 of the body on opposite sides of opening 17 will engage the other side of the bunch of stems 18 forming a three point engagement to hold them securely. This resilient finger 16 is turned as at 21 at its free end to provide a lip which extends substantially parallel to the body 10 and is spaced therefrom so that it may be easily engaged by the hand of the operator and lifted to insert the bunch of flower stems 18 therein. Also by reason of the opening 17 in the body and the foreshortening of the finger by its wide arcuate shape substantially on the arc of a semi-circle, the lip 21 and free end of the finger are brought inwardly from the end of the slot 17 so that the hand, by entering this slot, may be more easily inserted beneath this lip to manually lift it from position.

Finger 16 is stiffened by means of a rib 22 which extends along the curvature thereof and along the body as at 23 supporting the finger at its juncture with the body. This rib may also extend about the fold 11 as shown at 24 so as to stiffen the fold from bending that a better and more resistant resilient action may be had.

In Figs. 5 to 8 inclusive are illustrated a modified form of means for holding the body in position on a garment although the resilient finger or flower retaining means is substantially the same as just described.

The body portion of this modified form is designated 25 and from the stock of this body member two ears 26 are cut and bent rearward. Each of these ears is indented as at 27 to extend into the opening provided by a loop or single coil 28 at the hinge joint of a pin stem 29 so as to pivotally mount this pin stem in position to extend along the back of the body 25 for insertion through a portion of a garment while a catch 30 is cut and bent from the stock of the body 25 and shaped in the form of a hook beneath which the point 31 of the pin stem may be placed to retain the same in position and the body member in mounted position upon the garment. In some cases it will be, of course, readily understood that I may attach separate catches such as of the safety catch variety or pin stem joints by solder or swaging.

In Fig. 9 I have illustrated a bunch of flowers 33, the stems 18 of which are mounted beneath the finger 16 while the device as a whole is engaged along the edge 14 of fabric of the garment 34 for holding the bouquet of flowers in position.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A flower holder comprising a body member having spaced portions to engage one side of the stems of a bunch of flowers, a resilient finger arcuate in shape provided on and extending over the space between said portions of the body member to engage the other side of the stems of a bunch of flowers, said space providing a recess beneath the overextending finger to facilitate entrance beneath the same and to provide additional gripping edges and means secured to the body for supporting the same on a garment or other support.

2. A flower holder comprising a body member to engage one side of the stems of a bunch of flowers, a resilient finger arcuate in shape provided on the body member to engage the other side of the stems of a bunch of flowers, a stiffening rib extending along said finger, and means secured to the body for supporting the same on a garment or other support.

3. A flower holder comprising a body member to engage one side of the stems of a bunch of flowers, a single resilient finger arcuate in shape provided on the body member and located centrally thereof to engage the other side of the stems of a bunch of flowers, said finger being deflected at its free end to provide a lip extending in a plane generally parallel to the plane of the front surface of the body member, and means secured to the body for supporting the same on a garment or other support.

4. A flower holder comprising a sheet metal body member to engage one side of the stems of a bunch of flowers, a resilient finger arcuate in shape provided on the body member to engage the other side of the stems of a bunch of flowers, said finger having its free end spaced inwardly a substantial extent from the end of said body and being deflected at its free end to provide a lip extending in a plane generally parallel to the plane of the front surface of the body member and spaced a substantial distance therefrom.

5. A flower holder comprising a body member to engage one side of the stems of a bunch of flowers, a single resilient finger substantially on the arc of a semi-circle provided on and extending over the body member to engage the other side of the stems of a bunch of flowers, said finger being deflected at its free end to provide a lip extending in a plane generally parallel to the plane of the front surface of the body member, said body member being provided with a recess beneath the overextending finger to facilitate entrance beneath the same and to provide additional gripping edges, and means secured to the body for supporting the body on a garment or other support.

6. A flower holder comprising a sheet metal body member, a resilient finger cut and raised from the stock of said body member and of arcuate shape extending over the opening formed by said raising of the same from the sheet metal body.

7. A flower holder comprising a sheet metal body member, a resilient finger cut and raised from the stock of said body member and of arcuate shape extending over the opening formed by the raising of the same from the sheet metal body and with the end of the finger spaced from the sheet metal body.

8. A flower holder comprising a sheet metal body member, a resilient finger cut and raised from the stock of said body member, and a rib extending along said finger and said body at the junction of said finger and body to stiffen the same.

9. A flower holder comprising a sheet metal body member, a resilient finger cut and raised from the stock of said body member and of arcuate shape extending over the opening formed by the raising of the same from the sheet metal body, and a rib extending along said finger and said body at the junction of said finger and body to stiffen the same.

10. A flower holder comprising a body member, means integral therewith for attaching the same to a garment or support, a resilient finger cut and raised from the stock of said body member and of arcuate shape extending over the opening formed by the raising of the same from the sheet metal body.

11. A flower holder comprising a body member to engage one side of the stems of a bunch of flowers, a jaw folded from one end of said body to hold a garment between it and said body, a resilient finger arcuate in shape provided on the body member to engage the other side of the stems of a bunch of flowers, said finger being deflected at its free end to provide a lip extending in a plane generally parallel to the plane of the front surface of the body member and spaced a substantial distance therefrom.

12. A flower holder comprising a body member to engage one side of the stems of a bunch of flowers, a jaw folded from one end of said body to hold a garment between it and said body, a resilient finger arcuate in shape provided on the body member to engage the other side of the stems of a bunch of flowers, a rib raised from the stock of said body member and extending about the fold joining said jaw and body member.

13. A flower holder comprising a body member to engage one side of the stems of a bunch of flowers, a jaw folded from one end of said body to hold a garment between it and said body, a resilient finger arcuate in shape provided on the body member to engage the other side of the stems of a bunch of flowers, a rib raised from the stock of said body member and extending along said resilient finger and about the fold joining said jaw and body member.

14. A flower holder comprising a body member to engage one side of the stems of a bunch of flowers, a jaw folded from one end of said body to hold a garment between it and said body, said jaw being wider than said body with its marginal edges turned forward toward said body member to extend into the fabric engaged, a resilient finger, arcuate in shape, provided on the body member to engage the other side of the stems of a bunch of flowers.

15. A flower holder comprising a body member, portions of the stock thereof being deflected to provide pin joint and catch means for retaining the same in position, a resilient finger, arcuate in shape, provided on the body member to engage the other side of the stems of a bunch of flowers.

In testimony whereof I affix my signature.

JOHN H. LUFT.